United States Patent [19]

Miyoshi et al.

[11] Patent Number: 5,216,037
[45] Date of Patent: Jun. 1, 1993

[54] ROOM TEMPERATURE VULCANIZABLE, FOAMABLE POLYSILOXANE COMPOSITION

[75] Inventors: Kei Miyoshi; Masatoshi Arai, both of Annaka, Japan

[73] Assignee: Shin-Etsu Chemical Co, Ltd., Tokyo, Japan

[21] Appl. No.: 903,308

[22] Filed: Jun. 24, 1992

[30] Foreign Application Priority Data

Jun. 24, 1991 [JP] Japan .................. 3-178668

[51] Int. Cl.$^5$ ............................... C08J 9/02
[52] U.S. Cl. ....................... 521/88; 521/91; 521/92; 521/154
[58] Field of Search ........... 521/88, 91, 92, 154

[56] References Cited

U.S. PATENT DOCUMENTS

| | | | |
|---|---|---|---|
| 4,461,851 | 7/1984 | Hashimoto | 521/154 |
| 4,801,622 | 1/1989 | Inoue et al. | 521/154 |
| 4,931,485 | 6/1990 | Inoue et al. | 521/154 |
| 4,972,001 | 11/1990 | Kimura et al. | 521/154 |
| 5,017,624 | 5/1991 | Johnson | 521/154 |

FOREIGN PATENT DOCUMENTS

| | | |
|---|---|---|
| 33-9297 | 10/1958 | Japan . |
| 44-8755 | 4/1969 | Japan . |
| 45-9794 | 4/1970 | Japan . |
| 45-12675 | 5/1970 | Japan . |
| 51-46352 | 4/1976 | Japan . |
| 59-45330 | 3/1984 | Japan . |

Primary Examiner—Morton Foelak
Attorney, Agent, or Firm—Lowe, Price, LeBlanc & Becker

[57] ABSTRACT

A room temperature vulcanizable, foamable polysiloxane composition is described, which comprises:
(A) a specific type of α, ω-dihydroxyorganopolysiloxane which has a surface tension of not lower than 22 dynes/cm at 25° C.;
(B) a specific type of organopolyhydroxypolysiloxane;
(C) a polyorganohydrogensiloxane which has at least two units of the following general formula in one molecule

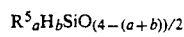

$$R^5_a H_b SiO_{(4-(a+b))/2}$$

wherein $R^5$ represents a monovalent hydrocarbon group except for aliphatic unsaturated hydrocarbon group, a is an integer of 0 to 2, and b is an integer of from 0 to 3 provided that the total of a+b is an integer of from 1 to 3;
(D) an unsubstituted or substituted alcohol having from 1 to 12 carbon atoms; and
(E) a platinum catalyst.

The composition has a high degree of foaming and the foamed product obtained from the composition has good foaming stability and good tensile strength.

13 Claims, No Drawings

ROOM TEMPERATURE VULCANIZABLE, FOAMABLE POLYSILOXANE COMPOSITION

BACKGROUND OF THE INVENTION

1. Field of the Invention

This invention relates to foamable polysiloxane compositions of the room temperature curable type which are improved in the degree of foaming and foam stability.

2. Description of the Prior Art

As set out in Japanese Patent Publication No. 45-12675, several ways of producing silicone rubber foamed articles at room temperature are known including a method wherein foaming agents are added when room temperature vulcanizable silicone rubber elastomers are obtained, and a method wherein room temperature vulcanizable silicone rubber compositions undergo foaming when cured or vulcanized. The latter method makes use of the dehydrogenation reaction between organosilicon compounds having the hydrogen atom directly joined to the silicon atom and organosilicon compounds having the hydroxyl group directly joined to the silicon atom. A number of catalysts for promoting the dehydrogenation reaction are known in the art. For instance, Japanese Patent Publication Nos. 33-9297 and 44-8755 describe quaternary ammonium salts, carboxylates of heavy metals and alkali metal alkoxides for use as the catalyst for the dehydrogenation reaction, and Japanese Patent Publication No. 45-9794 sets forth hydroxyamine compounds and organosilicon compounds having an aminoxy group directly bonded to the silicon atom. In addition, platinum compounds are taught in Japanese Laid-open Patent Application No. 51-46352.

However, the prior art foaming techniques are usually low in the degree of foaming and poor in the foam stability, thus presenting the problem on the improvement in heat insulation efficiency. Where the degree of foaming is improved by the use of $\alpha, \omega$-dihydroxyorganopolysiloxane with a low degree of polymerization as set forth in Japanese Laid-open Patent Application No. 59-45330, a disadvantage is inevitably involved in that the silicone rubber foamed material has a low tensile strength.

SUMMARY OF THE INVENTION

It is therefore an object of the invention to provide a room temperature vulcanizable, foamable polysiloxane composition which overcomes the disadvantages of the prior art compositions and which has a high degree of foaming and good foam stability.

It is another object of the invention to provide a room temperature vulcanizable, foamable polysiloxane composition which has good mechanical strengths such as a tensile strength.

The above objects can be achieved, according to the invention, by a room temperature vulcanizable, foamable polysiloxane composition which comprises:

(A) 100 parts by weight of an $\alpha, \omega$-dihydroxyorganopolysiloxane of the following general formula (I) which has a surface tension of not lower than 22 dynes/cm at 25° C.

$$HO-(SiR^1R^2-O)_l-H \quad (I)$$

wherein $R^1$ and $R^2$ may be the same or different and represent an unsubstituted or substituted monovalent hydrocarbon group and $l$ is an integer of from 20 to 3000;

(B) from 0.01 to 30 parts by weight of an organopolyhydroxypolysiloxane of the following general formula (II)

$$R_3SiO-(SiR^3R^4-O)_m-(SiR^5(OH)-O)-SiR_3 \quad (II)$$

wherein R, $R^3$, $R^4$ and $R^5$ may be the same or different and represents an unsubstituted or substituted monovalent hydrocarbon group except for aliphatic hydrocarbon groups, m is an integer of from 2 to 20, and On is an integer of from 3 of 20 carbon atoms;

(C) a polyorganohydrogensiloxane which has at least two units of the following general formula (III) in one molecule $$R^5{}_aH_bSiO_{(4-(a+b))/2} \quad (III)$$

wherein $R^6$ represents a monovalent hydrocarbon group except for aliphatic unsaturated hydrocarbon groups, a is an integer of 0 to 2, and b is an integer of from 0 to 3 provided that the total of a+b is an integer of from 1 to 3, the polyorganohydrogensiloxane being used in such an amount that the SiH group per unit mole of the hydroxyl group of the ingredients (A) and (B) and an ingredient (D) is contained in the range of from 0.5 to 20 moles;

(D) from 0.1 to 20 parts by weight of an unsubstituted or substituted alcohol having from 1 to 12 carbon atoms; and (E) from 0.1 to 200 ppm of a platinum catalyst, calculated, as a platinum metal, based on the total weight of the ingredients (A), (B) and (C).

DETAILED DESCRIPTION AND EMBODIMENTS OF THE INVENTION

The respective ingredients which are essential in the composition of the invention are now described.

The ingredient (A) is an $\alpha, \omega$-dihydroxyorganopolysiloxane of the general formula (I). In order to impart high mechanical strength to the polysiloxane formed product obtained after curing of the composition, the degree, $l$, of the polymerization of the polysiloxane should be in the range of from 20 to 3000. If the value of $l$ is smaller than 20, the resultant polysiloxane foamed product is not satisfactory with respect to the elongation. On the contrary, the value of $l$ exceeding 3000 is unfavorable from the standpoint of handling. Preferably, the value of $l$ is in the range of from 300 to 2000. In the formula (I), $R^1$ and $R^2$ may be the same or different and represent an unsubstituted or substituted monovalent hydrocarbon group. Examples of the monovalent hydrocarbon groups include an alkyl group having from 1 to 6 such as, for example, a methyl group, an ethyl group, a propyl group, a butyl group, a pentyl group or a hexyl group, an aryl group having from 6 to 12 carbon atoms such as a phenyl group, a naphthyl group or the like, and those groups mentioned above but substituted with a halogen atom such as a chloromethyl group, a 3,3,3-trifluoropropyl group and the like. In view of the ease in availability and the surface tension, it is preferred that 5 to 20% of $R^1$ is a phenyl group and $R^2$ is a methyl group.

The ingredient (B) is an organopolyhydroxypolysiloxane of the general formula (II)

$$R_3SiO-(SiR^3R^4-O)_m-(SiR^5(OH)-O)-SiR_3 \quad (II)$$

In the formula (II), R, $R^3$, $R^4$ and $R^5$ may be the same or different and represent an unsubstituted or substituted monovalent hydrocarbon group as defined with respect to the ingredient (A). From the standpoint of the ease in availability and the viscosity of the composition, it is preferred that R, $R^3$, $R^4$ and $R^5$ are each a methyl group or a phenyl group. In the formula, m is an integer of from 2 to 30, preferably from 10 to 20 and n is an integer of from 3 to 20, preferably from 5 to 20. If n is smaller than 3, the degree of foaming undesirably becomes low, so that there cannot be obtained a room temperature curable foaming polysiloxane composition which has a high degree of foaming as intended by the present invention. When n exceeds 20, the resultant foamed product is lowered in mechanical strength. The amount of the ingredient (B) should be in the range of from 0.01 to 30 parts by weight, preferably from 0.1 to 20 parts by weight, per 100 parts by weight of the ingredient (A). If the amount of the ingredient (B) is less than 0.01 part by weight, the thixotropic properties of the resultant composition are lowered, leading to poor foaming stability. Thus, there is not obtained a foamed product which has fine cells or foams with good foaming stability. When the amount exceeds 30 parts by weight, the crosslinking rate becomes so lowered that the respective cells are worsened in the shape.

The ingredient (C) used in the present invention has the hydrogen atoms directly joined to the silicone atoms and such hydrogen atoms undergo the dehydrogenation reaction with the hydroxyl groups directly boned to silicon atoms to generate hydrogen gas and to form crosslinkage. The ingredient (C) is a polyorganohydrogensiloxane which has at least two units of the general formula (III) in one molecule

$$R^5_a H_b SiO_{(4-(a-b))/2} \quad (III)$$

In the formula (III), $R^5$ is a monovalent hydrocarbon group including an alkyl group having from 1 to 6 carbon atoms such as, for example, a methyl group, an ethyl group, a propyl group, a butyl group, a pentyl group or a hexyl group, an aryl group such as a phenyl group, a naphthyl group or the like, and substituted hydrocarbon groups such as a chloromethyl group, a 3,3,3-trifluoropropyl group and the like. If there are a plurality of groups represented by $R^5$, such groups may be the same or different. In view of the ease in availability, $R^5$ is preferably a methyl group or a phenyl group. The hydrogen atoms directly joined to the silicon atoms may be present at a terminal end or at a side chain. The molecular structure may be linear, cyclic or branched. The ingredient (C) is used in such an amount that the SiH group is contained in the range of from 0.5 to 20 moles, preferably from 2 to 10 moles, per unit mole of the hydroxyl group of the ingredients (A), (B) and (D). If the amount is less than 0.5 moles, the degree of foaming and the foaming stability are not improved appreciably. Over 20 moles, the resultant foamed product does not become satisfactory with respect to the mechanical strength.

The ingredient (D) is an unsubstituted or substituted alcohol having from 1 to 12 carbon atoms. This ingredient causes reaction with the ingredient (C) in the presence of the ingredient (E) to generate hydrogen thereby controlling the degree of foaming. Examples of the alcohol include monohydric alcohols such as methanol, ethanol, n-propanol, iso-propanol, n-butanol, iso-butanol, tert-butanol, 2-butanol and the like, and polyhydric alcohols such as ethylene glycol, propylene glycol, glycerine and the like. Examples of the substituted alcohol include those compounds of the formulas, $C_2H_4OC_2H_4OH$, $CH_3OC_2H_4OH$ and the like. Of these, propanol and butanol are preferred because they are in good compatibility with the siloxane, are sufficient for addition only in small amounts and are readily available. The amount is in the range of from 0.1 to 20 parts by weight, preferably from 2 to 10 parts by weight, per 100 parts by weight of the ingredient (A). Especially, in the range of from 2 to 10 parts by weight, there are obtained the composition which ensures a high degree of foaming and also the foamed product from the composition which has high mechanical strength and good thermal stability.

The ingredient (E) is a platinum-based catalyst which promotes the dehydrogenation reaction between the ingredients (A), (B) and (D) and the ingredient (C). Examples of the ingredient (E) include metallic platinum, chloroplatinic acid, complexes of platinum and olefinic compounds, complexes of platinum and vinyl group-containing silanes or siloxanes, and phosphite complexes of platinum. In view of the stability of the composition prior to curing to which the ingredient (E) is added, chloroplatinic acid and complexes of platinum and olefinic compounds are preferred. The ingredient (E) is used in an amount of from 0.1 to 200 ppm, preferably from 1 to 50 ppm, based on the total weight of the ingredients (A), (B) and (C). If the amount is less than 0.1 ppm, the dehydrogenation reaction proceeds only slowly. The amount over 200 ppm is poor in economy.

The foamable polysiloxane composition of the invention may further comprise, as a diluent, polyorganosiloxanes which are blocked with a triorganosilyl group at both ends or at one end thereof, and vinyl group-containing silanes and siloxanes, if necessary, in amounts not impeding the inherent properties of the composition. In addition, there may be further used siloxane copolymers of the type represented by the formula, $(R^7_3SiO_\frac{1}{2})_x(R^8SiO_{3/2})_y(SiO_2)_z$, other fillers, pigments, dyes, heat resistance improvers, flame retardants and the like.

The present invention is more particularly described by way of examples.

EXAMPLES 1, 2 AND COMPARATIVE EXAMPLES 1, 2

An α,ω-dihydroxyorganopolysiloxane (A-1) which had an average structural formula, HO-(SiMe φ—O)$_5$.$_0$—(SiMe$_2$—O)$_{540}$—H, wherein Me represents a methyl group and φ represents a phenyl group, and which had a viscosity of 20,000 centistokes at 25° C., an organopolyhydrogenpolysiloxane (B-1) of the average structural formula, Me$_3$SiO—(SiMe$_2$—O)$_5$—(-SiMe(OH)—O)$_{10}$—SiMe$_3$, wherein Me represent a methyl group, which had a viscosity of 150 centistokes at 25° C., and a polyorganohydrogensiloxane (C-1) of the average structural formula, Me$_3$SiO—(SiMe(H-)—O)$_{38}$—SiMe$_3$, isopropyl alcohol (D-1) and an isopropyl alcohol solution (E-1) containing 2% of chloroplatinic acid were provided and used to prepared compositions of the examples and the comparative examples according to the formulations indicated in Table. The respective compositions were each subjected to foaming and curing to obtain foamed products. The degree of the foaming and an average diameter of cells of the foamed product were measured. The results are shown in Table below.

TABLE

| Ingredient | Comp. Ex. 1 | Comp. Ex. 2 | Example 1 | Example 2 |
|---|---|---|---|---|
| Composition (Parts By Weight): | | | | |
| A-1* (surface tension) | 100 (24.1) | 100 (24.1) | 100 (24.1) | 100 (24.1) |
| B-1 | 1 | 5 | 1 | 5 |
| C-1 | 20 | 20 | 20 | 20 |
| D-1 | 0.5 | 48 | 6 | 5 |
| E-1 | 0.5 | 0.5 | 0.5 | 0.5 |
| H/OH (by mole) | 20.8 | 0.4 | 3.15 | 3.34 |
| Degree of Foaming | 2 | 17.2 | 13.6 | 11.5 |
| Diameter of Cells (mm) | 0.1 | 0.8 | 0.1 | 0.1 |

*Dyne/cm at 25° C.

What is claimed is:

1. A room temperature vulcanizable, foamable polysiloxane composition which comprises:

(A) 100 parts by weight of an α, ω-dihydroxyorganopolysiloxane of the following general formula (I) which has a surface tension of not lower than 22 dynes/cm at 25° C.

$$HO-(SiR^1R^2-O)_l-H \qquad (I)$$

wherein $R^1$ and $R^2$ may be the same or different and represent an unsubstituted or substituted monovalent hydrocarbon group and l is an integer of from 20 to 3000;

(B) from 0.01 to 30 parts by weight of an organopolyhydroxypolysiloxane of the following general formula (II)

$$R_3SiO-(SiR^3R^4-O)_m-(SiR^5(OH)-O)-SiR_3 \qquad (II)$$

wherein R, $R^3$, $R^4$ and $R^5$ may be the same or different and represents an unsubstituted or substituted monovalent hydrocarbon group except for aliphatic hydrocarbon groups, m is an integer of from 2 to 20, and n is an integer of from 3 of 20 carbon atoms;

(C) a polyorganohydrogensiloxane which has at least two units of the following general formula (III) in one molecule $$R^5{}_aH_bSiO_{(4-(a-b))/2} \qquad (III)$$

wherein $R^5$ represents a monovalent hydrocarbon group except for aliphatic unsaturated hydrocarbon groups, a is an integer of 0 to 2, and b is an integer of from 0 to 3 provided that the total of a+b is an integer of from 1 to 3, the polyorganohydrogensiloxane being used in such an amount that the SiH group per unit mole of the hydroxyl group of the ingredients (A) and (B) and an ingredient (D) is contained in the range of from 0.5 to 20 moles;

(D) from 0.1 to 20 parts by weight of an unsubstituted or substituted alcohol having from 1 to 12 carbon atoms; and (E) from 0.1 to 200 ppm of a platinum catalyst, calculated as a platinum metal, based on the total weight of the ingredients (A), (B) and (C).

2. The polysiloxane composition according to claim 1, wherein in the formula (I), $R^1$ is a phenyl group at a rate of 5 to 20% of $R^1$ and $R^2$ is a methyl group.

3. The polysiloxane composition according to claim 1, wherein in the formula (II), R, $R^3$, $R^4$ and $R^5$ are independently a methyl group.

4. The polysiloxane composition according to claim 1, wherein in the formula (II), R, $R^3$, $R^4$ and $R^5$ are independently a phenyl group.

5. The polysiloxane composition according to claim 1, wherein in the formula (III), $R^5$ is a methyl group.

6. The polysiloxane composition according to claim 1, wherein in the formula (III), $R^5$ is a phenyl group.

7. The polysiloxane composition according to claim 1, wherein in the formula (III), when a is 2, $R^5$'s may be the same or different.

8. The polysiloxane composition according to claim 1, wherein the SiH group in the ingredient (C) is contained in an amount of from 2 to 10 moles per unit mole of the hydroxyl group of the ingredients (A), (B) and (D).

9. The polysiloxane composition according to claim 1, wherein the ingredient (D) is propanol.

10. The polysiloxane composition according to claim 1, wherein the ingredient (D) is butanol.

11. The polysiloxane composition according to claim 1, wherein the ingredient (E) is chloroplatinic acid.

12. The polysiloxane composition according to claim 1, wherein the ingredient (E) is a complex of platinum and an olefinic compound.

13. A foamed product obtained from the composition defined in claim 1.

* * * * *